United States Patent Office 3,146,166
Patented Aug. 25, 1964

3,146,166
COBALAMIN AND AMINO ACID COMPOSITIONS
John Godfrey Heathcote, Grange Park, St. Helens, England, assignor to The Distillers Company Limited, Edinburgh, Scotland, a British company
No Drawing. Filed Aug. 28, 1961, Ser. No. 134,090
Claims priority, application Great Britain Aug. 26, 1960
6 Claims. (Cl. 167—81)

The present invention relates to cobalamin-amino acid compositions, and in particular to cobalamin-amino acid compositions effective on oral administration against pernicious anaemia.

It is already known that cobalamins, for example cyanocobalamin and hydroxocobalamin, are of great value when administered parenterally in the treatment of pernicious anaemia, but are much less effective on oral administration.

It is an object of the present invention to provide cobalamin-amino acid compositions which are effective on oral administration against pernicious anaemia, as well as on parenteral administration.

Accordingly the present invention is a composition which comprises cobalamin mixed with at least one L-amino acid.

The composition can be suitably prepared, for example, by triturating in the dry state crystalline cobalamin and an L-amino acid. For good results thorough grinding is required.

Any non-toxic L-amino acid or mixed DL amino acid may be used, but it is preferred to use the naturally occurring L-amino acids, especially glutamic acid, aspartic acid, glycine, valine proline, arginine, cysteine, serine, alanine, leucine, isoleucine, phenyl-alanine, lysine, histidine, threonine, tryptophane, tyrosine, methionine or mixtures thereof. It is particularly preferred to use glutamic acid and aspartic acid.

As cobalamin, any physiologically active form of cobalamin may be used, for example cyanocobalamin, hydroxocobalamin, or nitritocobalamin. Mixtures of two or more cobalamins may be employed. It is particularly preferred to use cyanocobalamin, hydroxocobalamin and mixtures thereof.

The ratio of cobalamin to amino acid in the composition may vary widely. Generally, a weight for weight ratio of amino acid to cobalamin of between 1:1 and 20:1 is preferred. A ratio of 5:1 is particularly preferred.

For oral administration, the composition may if desired be suitably diluted with any of the commonly used pharmaceutical solid diluents, and presented in tablet form. Tablets containing 40 to 100 $\mu$g. of the cobalamin component are particularly suitable. Alternatively, the composition may be presented in liquid form, in which case any suitable solvent such as water may be used.

Where the composition is to be administered by parenteral injection, it may be dissolved in any of the usual sterile liquid diluents used in the art, for example sterile water, with appropriate adjustment of pH.

The present invention is further exemplified by the following examples:

EXAMPLE 1

1.5 parts by weight of L-glutamic acid and 0.3 part by weight of crystalline cyanocobalamin were triturated together into a fine powder.

This powder was suitably made into tablet form using mannitol as a diluent.

The preparation was orally administered to two pernicious anaemia patients, case A and case B. These patients were previously treated with oral doses of crystalline cyanocobalamin. The results of both the crystalline cyanocobalamin treatment and the cyanocobalamin L-glutamic acid treatment are shown by way of comparison in Tables I (case A) and II (case B). It will be seen that in both cases the orally administered cyanocobalamin/L-glutamic acid preparation gave results superior to those obtained with orally administered cyanocobalamin alone, as demonstrated by the steady increase in the haemoglobin value and packed cell volume when the cyanocobalamin/L-glutamic acid treatment was started, coupled with a further reticulocytosis.

*Table I.—Case A*

| Day | Haemoglobin, percent | Packed cell volume, percent | Reticulocytes, percent | Oral treatment (daily) |
|---|---|---|---|---|
| 0 | 56 | 23 | 1.0 | Nil. |
| 1 | 56 | 23 | 1.0 | 60 $\mu$g. crystalline cyanocobalamin. |
| 4 | | | 1.0 | Do. |
| 6 | 54 | 24 | 6.0 | Do. |
| 9 | 54 | 24 | 12.0 | Do. |
| 13 | 57 | 25 | 10.0 | 60 $\mu$g. of $B_{12}$ as the cyanocobalamin/L-glutamic acid preparation. |
| 14 | 54 | 25 | 3.3 | Do. |
| 16 | 57 | 24.5 | 5.8 | Do. |
| 19 | 60 | 27 | 7.6 | Do. |
| 21 | 62 | 28 | 13.4 | Do. |
| 23 | 64 | 29 | 9.0 | Do. |
| 26 | 66 | 29.5 | 5.2 | Do. |
| 28 | 70 | 30.0 | 3.4 | Do. |
| 30 | | | 3.0 | Do. |
| 41 | 86 | 37 | | Do. |

*Table II.—Case B*

| Day | Haemoglobin, percent | Packed cell volume, percent | Reticulocytes, percent | Oral treatment (daily) |
|---|---|---|---|---|
| 1 | 42 | 18 | 2.0 | 60 $\mu$g. crystalline cyanocobalamin. |
| 2 | | | 1.2 | Do. |
| 3 | | | 1.4 | Do. |
| 4 | | | 1.5 | Do. |
| 6 | 43 | 20 | 3.0 | Do. |
| 7 | | | 3.4 | Do. |
| 8 | | | 7.9 | Do. |
| 9 | | | 7.2 | Do. |
| 10 | | | 5.2 | Do. |
| 11 | 45 | 20.5 | 3.2 | 60 $\mu$g. $B_{12}$ as the cyanocobalamin/glutamic acid preparation. |
| 13 | | | 5.1 | Do. |
| 14 | | | 8.0 | Do. |
| 15 | 53 | 23 | 10.0 | Do. |
| 16 | | | 6.6 | Do. |
| 17 | | | 6.3 | Do. |
| 18 | | | 6.7 | Do. |
| 20 | 57 | 25.5 | 3.6 | Do. |
| 35 | 69 | 34.0 | | 40 $\mu$g. $B_{12}$ as the cyanocobalamin/glutamic acid preparation. |
| 70 | 78 | 39.0 | | Do. |
| 105 | 82 | 39.0 | | Do. |

EXAMPLE 2

A composition according to Example 1 was made up and tabletted with mannitol, except that the glutamic acid was replaced by L-aspartic acid.

The preparation was orally administered to a pernicious anaemia patient, case C. The results of the treatment are shown in Table III, from which it will be seen that in the eleven days following the start of the treatment, haemoglobin values and packed cell volume rose, whilst there was towards the end of the period a marked reticulocytosis.

Table III.—Case C

| Day | Haemo- globin, percent | Packed cell volume, percent | Reticu- locytes, percent | Oral treatment (daily) |
|---|---|---|---|---|
| 1 | 42 | 18 | 0.3 | 60 µg. of $B_{12}$ as the cyanocobalamin/ aspartic acid prep- aration. |
| 2 | | | 1.1 | Do. |
| 3 | | | 0.6 | Do. |
| 4 | | | 0.4 | Do. |
| 6 | | | 1.4 | Do. |
| 7 | 40 | 18 | 4.6 | Do. |
| 8 | | | 6.6 | Do. |
| 9 | | | 6.3 | Do. |
| 10 | | | 6.4 | Do. |
| 11 | 48 | 21 | 7.1 | Do. |

Similar compositions may be prepared according to Example 1 by substituting different L-amino acids or cobalamins.

I claim:

1. A composition of matter efficient on oral administration against pernicious anemia, said composition in dosage unit form consisting essentially of an amino acid and cobalamin, the ratio of the weight of the amino acid component to the weight of the cobalamin component being between 1:1 and 20:1.

2. A composition of matter efficient on oral administration against pernicious anemia, said composition in dosage unit form consisting essentially of an amino acid and cobalamin, said amino acid being selected from the group consisting of glutamic acid, aspartic acid, glycine, valine, proline, arginine, cysteine, serine, alanine, leucine, isoleucine, phenylalanine, lysine, histidine, tryptophane, tyrosine, methionine, threonine and mixtures thereof, the ratio of the weight of the amino acid component to the weight of the cobalamin component being between 1:1 and 20:1.

3. A composition of matter in accordance with claim 2, said amino acid being L-glutamic acid and said cobalamin being cyanocobalamin.

4. A composition of matter in accordance with claim 2, said amino acid being L-aspartic acid and said cobalamin being cyanocobalamin.

5. A process useful in the treatment of a person having pernicious anemia, which comprises orally administering to said person per unit dose an amino acid and cobalamin, the ratio of the weight of the amino acid component to the weight of the cobalamin component being between 1:1 and 20:1.

6. A process useful in the treatment of a person having pernicious anemia, which comprises orally administering to said person per unit dose an amino acid and cobalamin, said amino acid being selected from the group consisting of glutamic acid, aspartic acid, glycine, valine, proline, arginine, cysteine, serine, alanine, leucine, isoleucine, phenylalanine, lysine, histidine, tryptophane, tyrosine, methionine, threonine and mixtures thereof, the ratio of the weight of the amino acid component to the weight of the cobalamin component being between 1:1 and 20:1.

References Cited in the file of this patent

UNITED STATES PATENTS

| 2,662,048 | Winsten | Dec. 8, 1953 |
| 2,748,054 | Jurist | May 29, 1956 |
| 2,887,437 | Klioze | May 19, 1959 |

OTHER REFERENCES

Greenberg: Nature, vol. 180, No. 4599, December 21, 1957, pages 1401 and 1402 (167–81$B_{12}$ comp.).